Figure 1A:
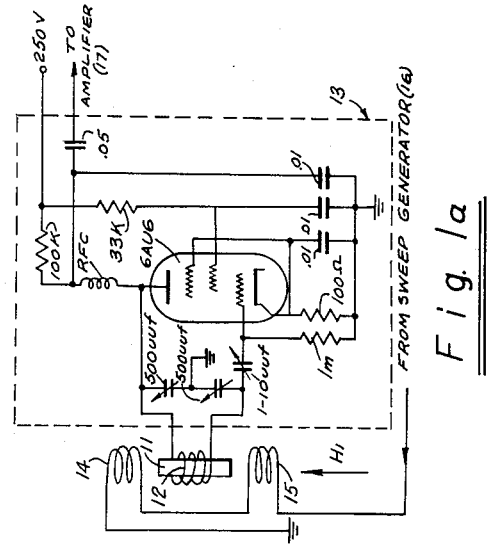

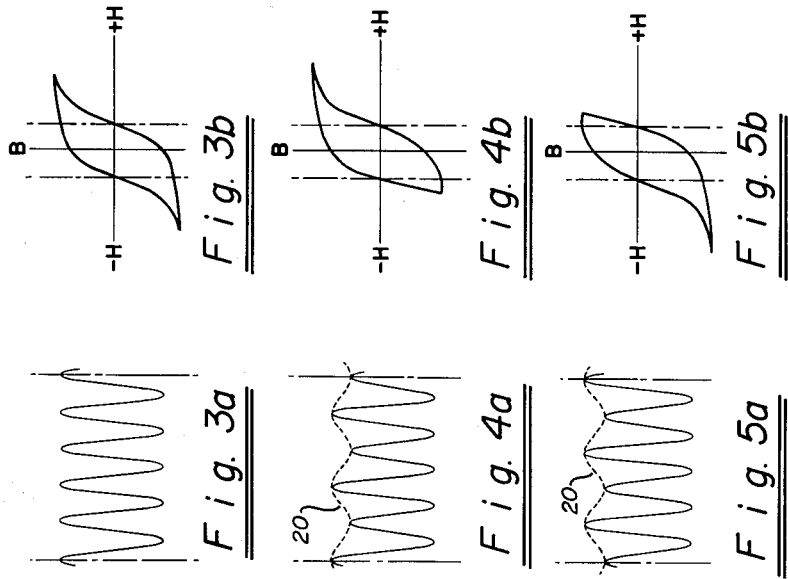
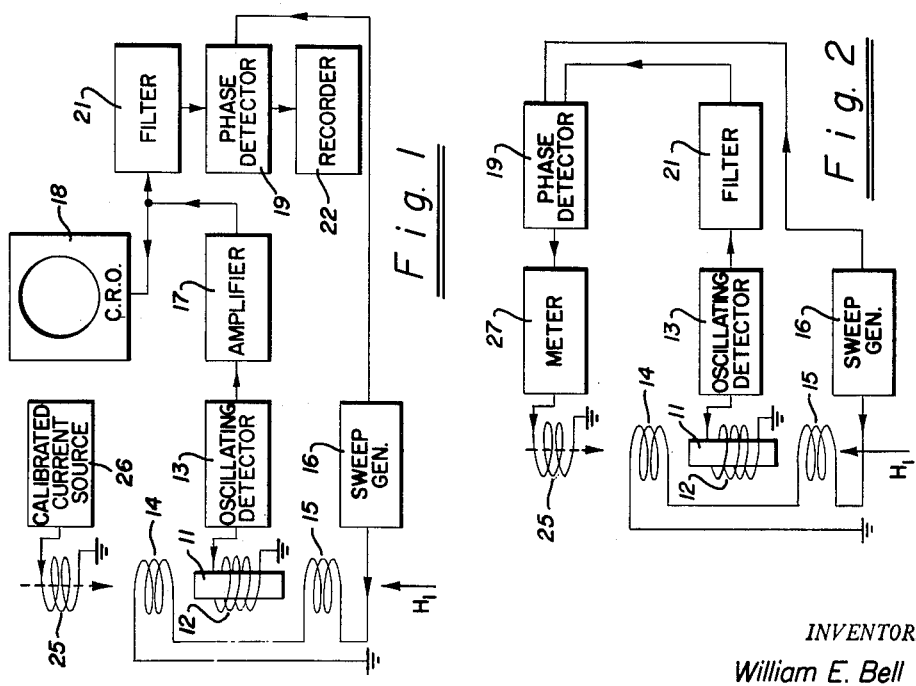

March 14, 1961 W. E. BELL 2,975,360
MAGNETOABSORPTION FLUX METER AND GRADIOMETER
Filed July 5, 1956 2 Sheets-Sheet 2

INVENTOR.
William E. Bell
BY
Paul B. Hunter
Attorney

United States Patent Office 2,975,360
Patented Mar. 14, 1961

2,975,360

MAGNETOABSORPTION FLUX METER AND GRADIOMETER

William E. Bell, Palo Alto, Calif., assignor to Varian Associates, San Carlos, Calif., a corporation of California Filed July 5, 1956, Ser. No. 595,965

18 Claims. (Cl. 324—43)

This invention relates in general to magnetic field measuring apparatus and more particularly to novel fluxmeter and gradiometer devices utilizing the principle of magnetoabsorption for accurately measuring magnetic fields or magnetic field gradients.

The novel phenomenon of magnetoabsorption is set forth in U.S. patent application Serial No. 523,738 entitled "Magnetoabsorption Method and Apparatus" filed on July 22, 1955 by the present applicant, and now Patent No. 2,909,725. This prior patent application discloses the magnetoabsorption principle wherein a high frequency alternating magnetic field is applied to a magnetic substance which, for example, may be a ferromagnetic, the substance absorbing energy from the high frequency energy source as a function of the magnetism due to the orientation and/or boundary displacement of the electron magnetic moment domains in the substance. In this present invention this magnetoabsorption principle is utilized to accurately measure the strength of a unidirectional magnetic field or a magnetic field gradient. This is accomplished in one embodiment of the fluxmeter, for example, by supplying radio frequency energy to a highly permeable material such as an iron bar or alloy core which is also subjected to a cyclically varying or A.C. magnetic field producing a cyclically changing magnetism in the core due to the reorientation and/or displacement of the electron domains in the material, the core absorbing energy from the radio frequency source as a function of the changing magnetism. This apparatus is positioned in a unidirectional magnetic field which one desires to measure. This superimposed unidirectional magnetic field acts on the core material such that an absorption of energy from the radio frequency source occurs which is substantially different from the absorption when a different magnetic field or no magnetic field is superimposed on the core. By proper interpretation of this change in the absorption, the direction and strength of this superimposed magnetic field may be determined. In one instance of use an easily calibrated magnetic field is produced in an opposite direction to the unknown field and superimposed on the core to effectively cancel out the magnetic field to be measured. When this calibrated magnetic field is substantially equal to the magnetic field to be measured such that it effectively cancels out said latter field, this fact will be evidenced by the magnetoabsorption signal assuming the shape and other characteristics obtained when no superimposed magnetic field is present. The known value of the calibrated magnetic field will therefore give the value of unknown magnetic field.

It is, therefore, the object of the present invention to provide a novel method and apparatus utilizing the principle of magnetoabsorption to accurately measure magnetic fields and magnetic field gradients.

One feature of the present invention is the provision of magnetoabsorption apparatus adapted to be positioned in a magnetic field to be measured in combination with means for accurately measuring the effect of this superimposed magnetic field on the magnetoabsorption signal such that the strength and direction of the magnetic field may be precisely determined.

Another feature of the present invention is the provision of a magnetoabsorption field measuring system as set forth in the immediately preceding feature in which the means for measuring the effect of this superimposed magnetic field on the magnetoabsorption apparatus includes a magnetic field producing means which produces a carefully controlled magnetic field in a direction to effectively cancel out the magnetic field to be measured in which instance the magnetoabsorption signal is returned to an easily detected normal condition, that is the condition existing when no magnetic field is present, this buckout magnetic field being easily measured so that the strength of the unknown field may be determined.

Still another feature of the present invention is the provision of a novel system for utilization in the apparatus of the above feature in which a feed-back circuit is utilized for producing the necessary canceling or buckout magnetic field directly in response to the magnetoabsorption signal obtained from the radio frequency energy source.

Still another feature of the present invention is the provision of novel magnetoabsorption apparatus of the preceding described featured types combined in such a manner in a superimposed magnetic field such that the magnetic field gradient therein is obtained.

Figure 6:
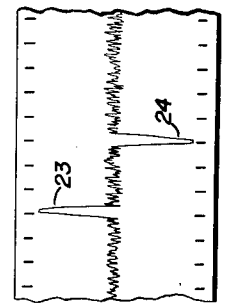
Figure 7:
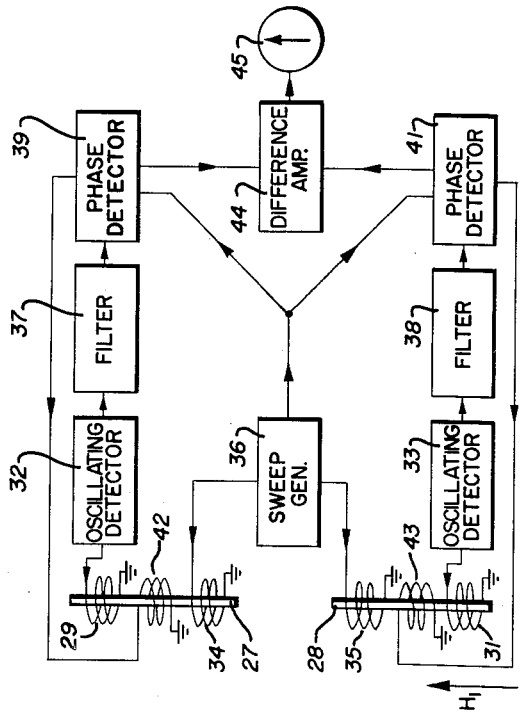
Figure 8:
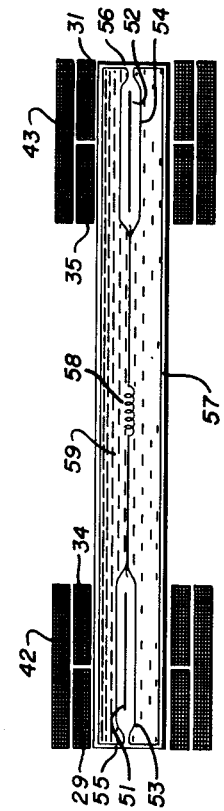

These and other features and advantages of the present invention will become more apparent upon a perusal of the following specification taken in connection with the accompanying drawings wherein, Fig. 1 is a block diagram of one embodiment of the present invention utilized for measuring the strength of a magnetic field, Fig. 1a shows in detail one oscillating detector that may be utilized in this invention, Fig. 2 is a block diagram of another embodiment of the present invention utilized for measuring the strength of a magnetic field somewhat similar to the apparatus of Fig. 1 with the exception that it operates in a more automatic manner, Figs. 3a, 4a, and 5a are wave forms of the magnetoabsorption signal appearing on the oscilloscope in the apparatus of Fig. 1, Fig. 3a showing the signal when no effective superimposed D.C. magnetic field is present, and Figs 4a and 5a showing the magnetoabsorption signal present when an effective superimposed D.C. magnetic field is present in one and the other of two different directions, Figs. 3b, 4b, and 5b are related to Figs. 3a, 4a, and 5a, respectively, and depict the hysteresis effect in the magneto absorption core, Fig. 3b showing the type of hysteresis when no effective magnetic field is present and Figs. 4b and 5b showing the change in the hysteresis type loop when an effective D.C. magnetic field is present extending in one and the other of two different directions, Fig. 6 is a strip chart recording showing momentarily superimposed magnetic fields as measured by the novel magnetoabsorption apparatus of this invention, the two peaks indicating fields extending in two different directions, Fig. 7 is a block diagram of a novel magnetoabsorption system utilized to measure magnetic field gradients, and Fig. 8 discloses one method for constructing a portion of the necessary apparatus utilized in the gradiometer system of Fig. 2, in which the two permeable magnetoabsorption cores are securely and accurately affixed together and aligned in a manner so as to resist damage.

Similar apparatus in the various figures bear similar reference numerals.

Referring now to Fig. 1 there is shown a bar or core 11 of high permeability material such as iron, this core being positioned within a radio frequency coil 12. This R.F. coil 12 in this embodiment is the inductive coil in the tuned circuit of an oscillating detector apparatus 13. An oscillating detector circuit suitable for use in the present invention is set forth in Fig. 1a. The circuit values given are suitable for producing approximately a one megacycle signal output. This particular oscillating detector is only one of various known types that may be employed by persons skilled in the art. Also positioned in axial alignment with the coil 12 and coupled to the core 11 are a pair of sweep coils 14 and 15, these sweep coils being connected in series to an audio sweep generator 16. The output of the oscillating detector 13 is coupled through an amplifier 17 to the vertical sweep input of a cathode ray oscilloscope 18, the horizontal sweep of the scope being an internal saw tooth or linear sweep. Of course, if the oscillating detector is provided with sufficient gain, no separate amplifier 17 is needed. This apparatus may be designated as a fundamental form of magnetoabsorption apparatus and operates in the following manner. A radio frequency energy of, for example, one megacycle is supplied to the R.F. coil 12 from the oscillating detector and produces an R.F. magnetic field enveloping the core 11. The core 11 absorbs energy from the R.F. coil as a function of the magnetism of the core 11.

The magnetism of the core which results in the energy absorption noted above is believed to be due to one or more of a number of physical effects occurring in the core. The following listed effects are believed to affect the magnetism and thus the absorption of energy from the radio frequency source; (1) changing eddy currents due to changing conductivity as a result of the Hall effect; (2) the effect of "domain flips" on eddy currents due to the fact that there are preferred directions for current flow in the electron magnetic moment domains in the core; (3) ordinary hysteresis generally believed to be delayed flipping of electron magnetic moment domains; (4) effect of the real part of reversible permeability on skin depth through which eddy currents can flow; and (5) direct energy absorption due to the complex part of the permeability. The particular embodiment disclosed herein as a preferred mode of operation utilizes a sweep field for periodically changing the magnetism of the high permeability cores so that the energy absorption could more conveniently be detected and recorded. Therefore the sixth effect in addition to the above five is the effect of the sweep field in causing the radio frequency hysteresis loops to fail to be closed. It should be noted that it is believed that not all of the above effects are present in all materials. For example, in bismuth it is believed that possibly only the effect (1) listed above may be present. Also, in nonconductive ferromagnetic material, for example, ferrites, it is believed that the prevalent effects are (3), (5) and (6) above. In other materials there is a possibility that all of the above six effects contribute to the absorption phenomenon of this invention. It should be stated that due to the complex nature of the phenomenon, the exact effect causing or producing this magnetoabsorption phenomenon may in subsequent years and after exhaustive studies prove to be due in part to some effect other than those listed above.

Although this absorption of energy from the coil 12 is very minute, it may be detected by the oscillating detector 13 due to the sensitivity of this well-known circuit, resulting in a change in the D.C. level output from the detector proportional to the energy absorption. An audio frequency of, for example, 60 cycles is supplied to the sweep coils 14 and 15. Typically, the radio frequency magnetic field is of the order of .01 gauss while the audio sweep magnetic field is of the order of 1.0 gauss. The periodically varying magnetic field set up by the sweep coils produces a periodically changing magnetism in the high permeability core 11. This changing magnetism results in a cyclical variation in the absorption of energy by the high permeability core 11 from the radio frequency coil 12. The output from the oscillating detector 13 controls the vertical sweeping of the cathode ray beam and results in a wave form which varies cyclically in accordance with the frequency of the sweep generator 16 and which has an amplitude dependent on the absorption of energy. In the absence of any additional superimposed magnetic field on the core, the type of signal which one obtains on the cathode ray oscilloscope from this magnetoabsorption apparatus is a symmetrical wave form such as shown in Fig. 3a. Fig. 3b is a graphic illustration of the hysteresis effect occurring in the core 11 during the period the trace of Fig. 3a is produced.

If now an external D.C. magnetic field $H_1$ extending in the direction of the arrow is superimposed upon the core 11, the magnetoabsorption effect in the bar 11 changes in a manner which bears a direct relationship to the strength and direction of the magnetic field $H_1$. When there is no superimposed D.C. magnetic field $H_1$, the magnetoabsorption signal of Fig. 3a contains only the second and higher order even harmonics of the A.C. core magnetization produced by the sweeping magnetic field. However, when the D.C. magnetic field $H_1$ is superimposed on the A.C. magnetization, the magnetoabsorption signal then contains an additional fundamental component whose phase and magnitude are directly related to the D.C. magnetization of the core. The effect of a superimposed D.C. magnetic field on the core 11 is better illustrated by referring to Figs. 4a, 4b, 5a and 5b. With the superimposed magnetic field extending in one direction, as $H_1$ in Fig. 1, the magnetization of the core 11 is illustrated by the hysteresis loop shown in Fig. 4b. The effect on the magnetoabsorption signal displayed on the oscilloscope 18 is illustrated in Fig. 4a where the magnetoabsorption signal is shown modulated by the fundamental to give the envelope as shown by the dotted line 20. Figs. 5a and 5b show wave forms which are similar to those in Figs. 4a and 4b, respectively, with the exception that the superimposed D.C. magnetic field in the case of Figs. 5a and 5b is opposite in direction to the superimposed magnetic field in the case of Figs. 4a and 4b. The envelope 20 is reversed in phase in Fig. 5a relative to the envelope in Fig. 4a. The strength of the superimposed D.C. magnetic field produces a direct effect on the amplitude of the peaks shown in Figs. 4a and 5a or, in other words, on the amplitude of the fundamental represented by envelope 20. For example, as the superimposed D.C. magnetic field $H_1$ increases in value, the larger peaks in the magnetoabsorption signal of Fig. 4a increase while the height of the smaller peaks decreases, i.e., the fundamental amplitude increases. As the D.C. magnetic field $H_1$ is decreased to zero, the amplitude of the fundamental 20 decreases until, at a zero superimposed field, the trace of Fig. 3a is produced. As the superimposed D.C. magnetic field increases in the opposite direction to that of magnetic field $H_1$, the fundamental 20 reverses in phase and increases in amplitude as shown in Fig. 5a. Thus, it is shown that both the direction and the strength of the superimposed D.C. magnetic field has a direct measurable effect on the magnetoabsorption signal produced.

One method for measuring this effect and thus the strength of the superimposed magnetic field comprises a coil 25 having a known moment which will produce, in response to a D.C. current flow therethrough, a D.C. magnetic field opposed to the magnetic field $H_1$. The D.C. current passed through the coil 25 is provided from a controlled calibrated source 26. When the trace on the oscilloscope assumes that wave form as depicted in Fig. 3a, the magnetic field produced by the coil 25 has effectively opposed the field $H_1$ to be measured thus resulting in an effective zero magnetic field superimposed on the core 11. By observing the amount of D.C. current necessary to accomplish the balancing and knowing the moment of the coil 25, the exact strength of the opposing or bucking magnetic field may be determined and thus the strength of the $H_1$ field may be accurately determined. The current source 6 may, of course, be calibrated directly in field strength.

The output of amplifier 17 may also be coupled to a phase detector 19. A suitable filter 21 which rejects the second harmonic component of the frequency of the sweep generator 16 may be utilized, if desired, to prevent any second harmonic disturbance in the phase detector 19. The phase detector 19 is also coupled to the sweep generator 16 for reference purposes and the output of the phase detector 19 is a D.C. signal, the amplitude of which is directly proportional to the strength of superimposed D.C. magnetic field $H_1$ and the sense of which is dependent on the direction of the field $H_1$. The output of the phase detector 19 may be transmitted to a suitable recorder means 22 such as a strip chart recorder and the sense and amplitude of the phase detector output recorded thereon. A typical recording that one would obtain on a strip chart recorder is shown in Fig. 6, the peak 23 shown therein representing a momentarily superimposed D.C. magnetic field of a strength of approximately 5 gammas in the direction of the field $H_1$ and the peak 24 representing a momentarily superimposed D.C. magnetic field of the same value in the direction opposite to $H_1$.

Those skilled in the magnetometer art will recognize a relationship between the present magnetoabsorption magnetometer and the well-known fluxgate or saturable core magnetometer employed in making magnetic field measurements from airborne or land vehicles.

A complete description of this fluxgate magnetometer is set forth in a book entitled "Exploration Geophysics," second edition, 1950, authored by J. J. Jakosky and published by the Trija Publishing Co. of Los Angeles, California, particularly on pages 231 to 237. The present magnetometer may be calibrated in much the same way that the fluxgate magnetometer is calibrated, that is, by using a Helmholtz coil to set up a magnetic field of a precise known strength enveloping the core and then calibrating the unit with reference to this known magnetic field. As with the fluxgate magnetometer, the magnetoabsorption magnetometer must be maintained at a constant average orientation throughout a series of readings since it measures the component of the superimposed magnetic field parallel to the core.

The magnetoabsorption type magnetometer is preferable in certain respects to the fluxgate magnetometer. For example, the magnetoabsorption magnetometer employs a simple sweep excitation of the magnetoabsorption core, that is, there is no need for a pure sweep wave form as is necessary in the flux gate type magnetometers. The magnetoabsorption magnetometer also needs only simple amplifier requirements since harmonic or wave form distortion effects may be ignored. In addition, there are no diffcult filter problems and no sweep buckout adjustments as in the fluxgate magnetometer. Also, the size of the magnetoabsorption core may be very small relative to the fluxgate type magnetometer core and, because of this small size, the magnetoabsorption core is appreciably easier to mount so as to resist shock or vibrations or the like.

Referring now to Fig. 2 there is shown a system somewhat similar to that shown in Fig. 1 in which the D.C. current necessary to produce the buckout or canceling magnetic field, rather than being supplied from a calibrated current source which is manually operated, is supplied directly in a feed-back type circuit from the output of the phase detector 19. As stated above with reference to Fig. 1, the output from the phase detector 19 is a D.C. voltage, the sense of which is proportional to the direction of the superimposed D.C. magnetic field and the amplitude of which is proportional to the strength of the D.C. magnetic field.

This D.C. signal is transmitted through a D.C. current meter 27, which indicates both the amplitude and the sense of the D.C. output from the phase detector 19 and thereby gives a precise indication of the strength and direction of the magnetic field $H_1$, to the buckout coil 25 which produces the necessary D.C. magnetic field to oppose the field $H_1$ to be measured.

Referring now to Fig. 7 there is shown a novel gradiometer circuit utilizing the principle of the present invention to measure the gradient in a D.C. magnetic field $H_1$. For this purpose two highly permeable alloy cores 27 and 28 are provided and are positioned a fixed distance apart and in axial alignment. Encircling each of these cores is a separate one of a pair of radio frequency coils 29 and 31 which form part of the tuned circuits of associated oscillating detector circuits 32 and 33. The A.C. magnetizing field is supplied to each core by separate ones of a pair of sweep coils 34 and 35 coupled to a sweep generator or core excitation generator 36. The energy absorption by each core 27, 28 from the two associated oscillating detectors 32 or 33 is a function of the particular superimposed D.C. magnetic field at the related cores as explained above. If there is no gradient $\Delta H$ in the D.C. magnetic field between the two cores, the energy absorption from each oscillating detector will be equal while if a gradient $\Delta H$ does exist the energy absorption by the two cores 27 and 28 will be different and this difference will have an amplitude dependent on the amplitude of the gradient $\Delta H$ and a sense dependent on the direction of the gradient. The outputs from the oscillating detectors 32 and 33 are coupled through filter circuits 37 and 38, which reject the second harmonic of the core excitation A.C. sweep frequency, to phase detectors or phase sensitive amplifiers 39 and 41 which are also coupled to the sweep or core excitation generator 36 for reference. The output from each phase detector 39 and 41 is a D.C. voltage, the amplitude of which is proportional to the strength of the D.C. magnetic field at the respective cores 27, 28. The output of each phase detector 39, 41 is coupled through buckout field producing coils 42, 43 producing D.C. magnetic fields which effectively cancel out the superimposed D.C. magnetic fields at the cores. If there is no field gradient present, the output from each of the phase detectors 39, 41 will be equal as determined in a difference amplifier 44 which is coupled to the outputs of the phase detectors, the output from difference amplifier 44 being zero as will be noted on an indicator such as a meter 45. However, if a field gradient $\Delta H$ does exist, the difference amplifier 44 will produce a D.C. output which will have an amplitude dependent on the strength of the gradient and a sense dependent on the direction of the gradient. This amplitude and sense will be indicated on the meter 45 and will thus give an accurate indication of the gradient existing in the field $H_1$.

Referring to Fig. 8 there is shown one particular physical structure of a portion of the gradiometer instrument shown in Fig. 2. The two aligned cores are shown as high permeability iron needles 51, 52 which are embedded in glass or quartz rods 53, 54. The outer ends of the rods are secured to the closed ends 55, 56 of a rigid, non-metallic tube 57. The inner ends of the two rods are connected by means of a spring 58 which maintains a tension on the two rods and thus maintains the needles 51, 52 rigidly aligned axially in the tube 57. The non-metallic tube 57 is filled with a suitable fluid 59 to critically damp the rods therein so that vibrations of the complete assembly will not produce any appreciable change in the alignment of the needles. The sweep excitation, the R.F. and the field buckout coils are all shown encircling the respective needles, these coils of wire being similar to those shown in Fig. 2 and bearing the same reference numerals as those shown in Fig. 2.

Those skilled in the art will realize that other embodiments of this invention are possible such as, for example, systems for detecting the magnetoabsorption effect other than those employing an oscillating detector such as balancing bridge techniques or any like device which will accurately measure the Q of a radio frequency coil. Also, it may be desirable in some instances to detect the magnetoabsorption by detecting the frequency change in a radio frequency source rather than a change in the amplitude of an output signal from the oscillating detector.

Although a sweep field was used in the above embodiments to periodically change the magnetism of the high permeability cores so that the energy absorption could more conveniently be detected and recorded, it should be understood that the sweep field might be eliminated. The output of the oscillating detector would then be a steady-state voltage, the amplitude of which would vary as a function of the magnetism of the high permeability core. Referring for example to Fig. 1, if such a method were used, the sweep coils 14 and 15, the sweep generator 16, the filter 21 and the phase detector 19 could be eliminated from the system.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for measuring the strength of an unknown magnetic field which comprises an object of good magnetic permeability adapted to be positioned in said magnetic field which magnetizes said object, means for cyclically varying the magnetism of said object through its hysteresis loop, means for inducing a radio frequency magnetic field in said object from a radio frequency source, means for detecting the absorption of energy from said radio frequency source, said absorption being a function proportional to the strength of said unknown magnetic field, and means for converting said detected absorption into a magnetic field reading indicating the strength of said unknown magnetic field.

2. Apparatus for measuring the strength of a unidirectional magnetic field component which comprises a high magnetic permeability object adapted to be positioned in said magnetic field which magnetizes said object, means for applying a radio frequency magnetic field from a radio frequency energy source to said object, means for applying a cyclically varying magnetizing force to said object to vary its magnetism through its hysteresis loop, means for detecting the absorption of energy from the radio frequency source by said object as a function of the changing magnetism, said unidirectional magnetic field producing an effect on said absorption which is a direct function of the strength of the unidirectional magnetic field, and means for converting said detected absorption of energy into a measurable electrical potential readable as a value of magnetic field intensity.

3. Apparatus as claimed in claim 2 wherein said means for applying a cyclically varying magnetizing force to said object comprises a sweep generator inductively coupled to said object producing an alternating magnetic field.

4. Apparatus for measuring the strength of the unidirectional magnetic field component which comprises a high magnetic permeability object adapted to be positioned in said magnetic field which magnetizes said object, means for applying a radio frequency magnetic field from a radio frequency energy source to said object, means for applying a cyclically varying magnetizing force to said object to vary its magnetism through its hysteresis loop, means for detecting the absorption of energy from the radio frequency source by said object as a function of its changing magnetism, said unidirectional magnetic field producing an effect on said absorption which is a direct function of the unidirectional magnetic field, means for producing a D.C. potential which is a direct function of said energy absorption, and means responsive to said D.C. potential for indicating said field strength.

5. Apparatus as claimed in claim 4 wherein said means for applying a cyclically varying magnetizing force to said object comprises a sweep generator inductively coupled to said object producing an alternating magnetic field.

6. Apparatus for measuring the strength of a unidirectional magnetic field component which comprises a high magnetic permeability object adapted to be positioned in said magnetic field, means including an oscillating detector for applying a radio frequency magnetic field to said object, means for applying an alternating magnetic field to said object for changing the magnetism thereof, the frequency of said alternating magnetic field being low relative to the radio frequency magnetic field the magneto absorption material absorbing energy from the oscillating detector as a function of the changing alternating magnetic field, said unidirectional magnetic field producing an effect on said absorption which is a direct function of the strength of the unidirectional magnetic field, and a phase detector circuit coupled to said oscillating detector and coupled to said alternating magnetic field means for producing a D.C. potential output, the amplitude of which is proportional to the strength of the unidirectional magnetic field and the sense of which is dependent on the direction of the unidirectional magnetic field, said D.C. potential thereby serving to indicate the strength and direction of said unidirectional magnetic field.

7. Apparatus for measuring the strength of the unidirectional magnetic field component which comprises a high magnetic permeability object adapted to be positioned in said magnetic field and magnetized thereby, means for applying a radio frequency magnetic field from a radio frequency energy source to said object, means for applying an alternating magnetic field to said object to change the magnetism thereof, the frequency of said alternating magnetic field being low relative to the radio frequency magnetic field, means for detecting the absorption of energy from said radio frequency source by said object as a function of the changing alternating magnetic field, said unidirectional magnetic field component producing an effect on said absorption which is a direct function of the strength of the unidirectional magnetic field component, and means for producing a calibrated unidirectional magnetic field of known strength opposite in direction to the unidirectional magnetic field component to be measured and enveloping said magnetoabsorption material such that said known magnetic field effectively cancels out the effect on said absorption of said unknown unidirectional magnetic field whereby the known value of calibrated magnetic field will indicate the strength of the magnetic field being measured.

8. Apparatus as claimed in claim 7 wherein said means for applying the radio frequency magnetic field to said object comprises a first coil, said means for applying an alternating magnetic field to said object comprises a second coil, and said means for producing a unidirectional magnetic field opposed to said magnetic field component to be measured comprises a third coil.

9. Apparatus for measuring the strength of a unidirectional magnetic field component which comprises a high magnetic permeability object adapted to be positioned in said magnetic field and magnetized thereby, means including an oscillating detector for applying a radio frequency magnetic field to said object, means for applying an alternating magnetic field to said object to change the magnetism thereof, the frequency of said alternating magnetic field being low relative to the radio frequency magnetic field, means for detecting the absorption of energy from said oscillating detector by said object as a function of the changing alternating magnetic field, said unidirectional magnetic field producing an effect on said absorption which is a direct function of the strength of the unidirectional magnetic field, a phase detector coupled to the output of said oscillating detector and to said alternating magnetic field means, the output of said phase detector being a D.C. potential, the amplitude of which is proportional to the strength of said unidirectional magnetic field and the sense of which is dependent on the direction of said unidirectional magnetic field, and means coupled to the output of said phase detector responsive to said D.C. potential for producing a unidirectional magnetic field enveloping said object which is proportional to and opposite in direction to the unidirectional magnetic field to be measured.

10. Apparatus as claimed in claim 7 wherein said means for producing the opposing magnetic field comprises a coil, and including an indicator coupled to the output of said phase detector for indicating the magnitude of said D.C. signal output.

11. Apparatus for measuring the strength of a magnetic field gradient in a unidirectional magnetic field which comprises a pair of high magnetic permeability objects adapted to be positioned in the unidirectional magnetic field a fixed distance apart in axial alignment, means for applying to each of said objects radio frequency magnetic fields from associated radio frequency energy sources, means for applying a cyclically varying magnetizing force to each of said objects to vary their magnetism through their hysteresis loop, means for detecting the absorption of energy from each radio frequency source by its associated object as a function of the changing magnetism in the object, said unidirectional magnetic field producing an effect on the absorption from each radio frequency energy source which is a direct function of the strength of the unidirectional magnetic field at each object, and means for comparing the difference in the energy absorbed by each object whereby the magnetic field gradient between objects may be determined.

12. Apparatus as claimed in claim 11 wherein said means for applying a cyclically varying magnetizing force to said objects comprises an alternating frequency sweep generator.

13. Apparatus as claimed in claim 11 wherein said means for applying a radio frequency magnetic field to each of said objects comprises an oscillating detector coupled to each object, a pair of phase detectors, the output of each of said oscillating detectors being coupled to an associated one of said detectors, and a difference amplifier coupled to the output of each of said phase detectors for indicating the difference in the D.C. amplitude outputs from said phase detectors.

14. Apparatus for use in determining the gradient in a magnetic field which comprises a pair of elongated high permeability members each embedded in a solid non-magnetic substance, a hollow, elongated container having closed ends, means for securely coupling one end of each of said embedded objects to separate ends of said hollow container and spring means for connecting the inner ends of each of said objects together whereby said elongated objects are securely affixed within said hollow member in spaced apart, axial alignment, and a viscous fluid surrounding said objects within said hollow member whereby said members are critically damped within said member.

15. Apparatus for measuring the strength of a unidirectional magnetic field component which comprises a high magnetic permeability object adapted to be positioned in said magnetic field and magnetized thereby, means for applying a radio frequency magnetic field to said object from a radio frequency source, means for applying an alternating magnetic field to said object for changing the magnetism thereof, the frequency of said alternating magnetic field being low relative to the radio frequency magnetic field, the magnetoabsorption material absorbing energy from said source as a function of the changing alternating magnetic field, said unidirectional magnetic field producing an effect on said absorption which is a direct function of the strength of the unidirectional magnetic field, and a phase detector circuit coupled to said radio frequency means and coupled to said alternating magnetic field means for producing a D.C. potential output, the amplitude of which is proportional to the strength of the unidirectional magnetic field and the sense of which is dependent on the direction of the unidirectional magnetic field, said D.C. potential thereby serving to indicate the strength and direction of said unidirectional magnetic field.

16. Apparatus as claimed in claim 15 wherein the radio frequency magnetic field and the alternating magnetic field are both substantially parallel to the unidirectional magnetic field to be measured.

17. Apparatus for measuring the strength of a unidirectional magnetic field component as claimed in claim 15 which comprises means coupled to the output of said phase detector responsive to said D.C. potential for producing a unidirectional magnetic field enveloping said object which is proportional to and opposite in direction to the unidirectional magnetic field to be measured.

18. Apparatus for measuring the strength of a unidirectional magnetic field component which comprises a high magnetic permeability object adapted to be positioned in said magnetic field and magnetized thereby, a first electrical coil inductively coupled to said object, a radio frequency electrical source coupled to said first coil for producing a radio frequency current flow in said coil to thereby induce a radio frequency magnetic field in said object, a second electrical coil inductively coupled to said object, a sweep generator coupled to said second coil for producing a current flow therein of alternating frequency to thereby produce an alternating frequency magnetic field in said object, said first and second coils being mutually parallel and adapted to be aligned with the unkown unidirectional magnetic field, means coupled to said radio frequency source for detecting the absorption of energy therefrom by said object as a function of the changing alternating magnetic field, said unidirectional magnetic field producing an effect on said absorption which is a direct function of the strength of the unidirectional magnetic field, and means coupled to the output of said radio frequency source and to said sweep generator for producing a D.C. potential output, the amplitude of which is proportional to the strength of said unidirectional magnetic field and the sense of which is dependent on the direction of said unidirectional magnetic field, said D.C. output serving as an indication of the unidirectional magnetic field strength.

References Cited in the file of this patent
UNITED STATES PATENTS

| | | |
|---|---|---|
| Re. 23,950 | Bloch et al. | Feb. 22, 1955 |
| 2,480,265 | Rubenstein | Aug. 30, 1949 |
| 2,520,677 | Fearon | Aug. 29, 1950 |
| 2,564,777 | Cavanagh | Aug. 21, 1951 |
| 2,620,381 | Mayes et al. | Dec. 2, 1952 |
| 2,645,563 | Jensen | July 14, 1953 |
| 2,671,275 | Burns | Mar. 9, 1954 |
| 2,752,564 | Ryerson | June 26, 1956 |
| 2,772,393 | Davis | Nov. 27, 1956 |
| 2,774,060 | Thompson | Dec. 11, 1956 |
| 2,806,181 | Rockafellow | Sept. 10, 1957 |

FOREIGN PATENTS

| | | |
|---|---|---|
| 600,915 | Great Britain | Apr. 22, 1948 |

OTHER REFERENCES

The Review of Scientific Instruments, vol. 21, No. 3, March 1950, pages 219–225, article by Pound.